(12) United States Patent
Tajima et al.

(10) Patent No.: US 12,474,692 B2
(45) Date of Patent: Nov. 18, 2025

(54) CONTROL DEVICE AND CONTROL METHOD FOR MACHINE TOOL

(71) Applicant: FANUC CORPORATION, Yamanashi (JP)

(72) Inventors: Daisuke Tajima, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 439 days.

(21) Appl. No.: 18/002,045

(22) PCT Filed: Jun. 24, 2021

(86) PCT No.: PCT/JP2021/023927
§ 371 (c)(1),
(2) Date: Dec. 15, 2022

(87) PCT Pub. No.: WO2022/004546
PCT Pub. Date: Jan. 6, 2022

(65) Prior Publication Data
US 2023/0229141 A1 Jul. 20, 2023

(30) Foreign Application Priority Data
Jun. 30, 2020 (JP) .................... 2020-112599

(51) Int. Cl.
*G05B 19/416* (2006.01)
*B23B 39/08* (2006.01)
(Continued)

(52) U.S. Cl.
CPC ............ *G05B 19/416* (2013.01); *B23B 39/08* (2013.01); *B23G 1/18* (2013.01); *B23Q 15/24* (2013.01)

(58) Field of Classification Search
None
See application file for complete search history.

(56) References Cited

U.S. PATENT DOCUMENTS

| 4,985,841 A | * | 1/1991 | Iwagaya | ............... | G05B 19/186 408/11 |
| 2016/0116909 A1 | * | 4/2016 | Morita | ................ | G05B 19/186 700/188 |

FOREIGN PATENT DOCUMENTS

| CN | 102785125 A | 11/2012 |
| CN | 102922059 A | 2/2013 |

(Continued)

OTHER PUBLICATIONS

International Search Report issued in PCT/JP2021/023927; mailed Sep. 21, 2021.

*Primary Examiner* — Ryan A Jarrett
(74) *Attorney, Agent, or Firm* — Studebaker Brackett PLLC (57) ABSTRACT

Provided are a control device and a control method for a machine tool which are capable of further reducing a command-waiting time. This control device for a machine tool which controls synchronized operation of a main shaft and a feed shaft comprises: a numerical value control unit; a main shaft control unit; a rotation detection unit. The numerical value control unit has a main shaft command output unit which, when a cutting operation and pulling-out operation are carried out from a machining start position to a target position an arbitrary number of times, acquires from the tapping program the rotation amount and the maximum rotation speed of the main shaft in the cutting operation and pulling-out operation and which supplies the rotation amount and the maximum rotation speed of the main shaft to the main shaft control unit as the main shaft command.

6 Claims, 5 Drawing Sheets

(51) Int. Cl.
*B23G 1/18* (2006.01)
*B23Q 15/24* (2006.01)

(56) References Cited

FOREIGN PATENT DOCUMENTS

| | | | |
|---|---|---|---|
| JP | S62-224520 | A | 10/1987 |
| JP | 2016-078223 | A | 5/2016 |
| JP | 6001633 | B2 | 10/2016 |
| WO | 87/05839 | A1 | 10/1987 |

* cited by examiner

CONTROL DEVICE AND CONTROL METHOD FOR MACHINE TOOL

TECHNICAL FIELD

The present invention pertains to a control device and a control method for a machine tool.

BACKGROUND ART

Conventionally, for a machine tool that performs tapping in accordance with synchronous operation of a main shaft and a feed shaft, various techniques for improving machining accuracy or shortening a cycle time have been proposed (for example, refer to Patent Document 1) Patent Document 1 discloses a control device that can, with a simple configuration, shorten cycle time by performing control to maximize the acceleration capability of a main shaft.
Patent Document 1: Japanese Unexamined Patent Application, Publication No. 2016-78223

DISCLOSURE OF THE INVENTION

Problems to be Solved by the Invention

For such a control device for a machine tool, there is a desire to further reduce command-waiting time from the end of operation for a path until the start of operation for the next path, in order to further shorten cycle time.

Means for Solving the Problems

A control device according to the present disclosure is for a machine tool and is configured to control synchronous operation for a main shaft and a feed shaft. The control device includes: a numerical control unit configured to, based on a tapping program, create a main shaft command and a feed shaft command; a main shaft control unit configured to control a rotation operation by the main shaft in accordance with the main shaft command; a rotation detection unit configured to detect a rotation position of the main shaft; and a feed shaft control unit configured to, based on the rotation position, control a feeding operation by the feed shaft in accordance with the feed shaft command. The numerical control unit has a main shaft command output unit configured to, when performing a cutting operation and a pulling-out operation an arbitrarily-defined number of times from a machining start position until a target position, obtain, from the tapping program, a rotation amount and a maximum rotation speed for the main shaft in the cutting operation and the pulling-out operation, and send the rotation amount and the maximum rotation speed for the main shaft to the main shaft control unit as the main shaft command. The main shaft control unit has an initial operation control unit configured to cause the main shaft to undergo accelerating rotation, at a maximum capability in which an allowable current for a drive source is maximally used, from the machining start position toward the target position, with the maximum rotation speed as a target value; a maximum acceleration detection unit configured to, based on the rotation position during the accelerating rotation at the maximum capability, detect a maximum acceleration; a remaining rotation amount detection unit configured to, based on the rotation amount and the rotation position, detect a remaining rotation amount for the main shaft from a current position until the target position is reached; a current speed detection unit configured to, based on the rotation position, detect a current speed for the main shaft; and a positioning operation control unit configured to, after the accelerating rotation at the maximum capability and based on the maximum acceleration, the remaining rotation amount, and the current speed, cause the main shaft to undergo decelerating rotation at a maximum deceleration corresponding to the maximum acceleration and cause the main shaft to reach the target position.

A control method according to the present disclosure is for a machine tool and is for controlling synchronous operation for a main shaft and a feed shaft. The control method includes: when performing a cutting operation and a pulling-out operation an arbitrarily-defined number of times from a machining start position until a target position, obtaining, from a tapping program, a rotation amount and a maximum rotation speed for the main shaft in the cutting operation and the pulling-out operation; causing the main shaft to undergo accelerating rotation, at a maximum capability in which an allowable current for a drive source is maximally used, from the machining start position toward the target position, with the maximum rotation speed as a target value; based on a rotation position feedback value for the main shaft during the accelerating rotation at the maximum capability, detecting a maximum acceleration; based on the rotation amount and the rotation position feedback value, detecting a remaining rotation amount for the main shaft from a current position until the target position is reached; based on the rotation position feedback value, detecting a current speed for the main shaft; and after the accelerating rotation at the maximum capability and based on the maximum acceleration, the remaining rotation amount, and the current speed, causing the main shaft to undergo decelerating rotation at a maximum deceleration corresponding to the maximum acceleration and causing the main shaft to reach the target position.

Effects of the Invention

By virtue of the present invention, it is possible to further reduce command-waiting time.

PREFERRED MODE FOR CARRYING OUT THE INVENTION

Figure 1:
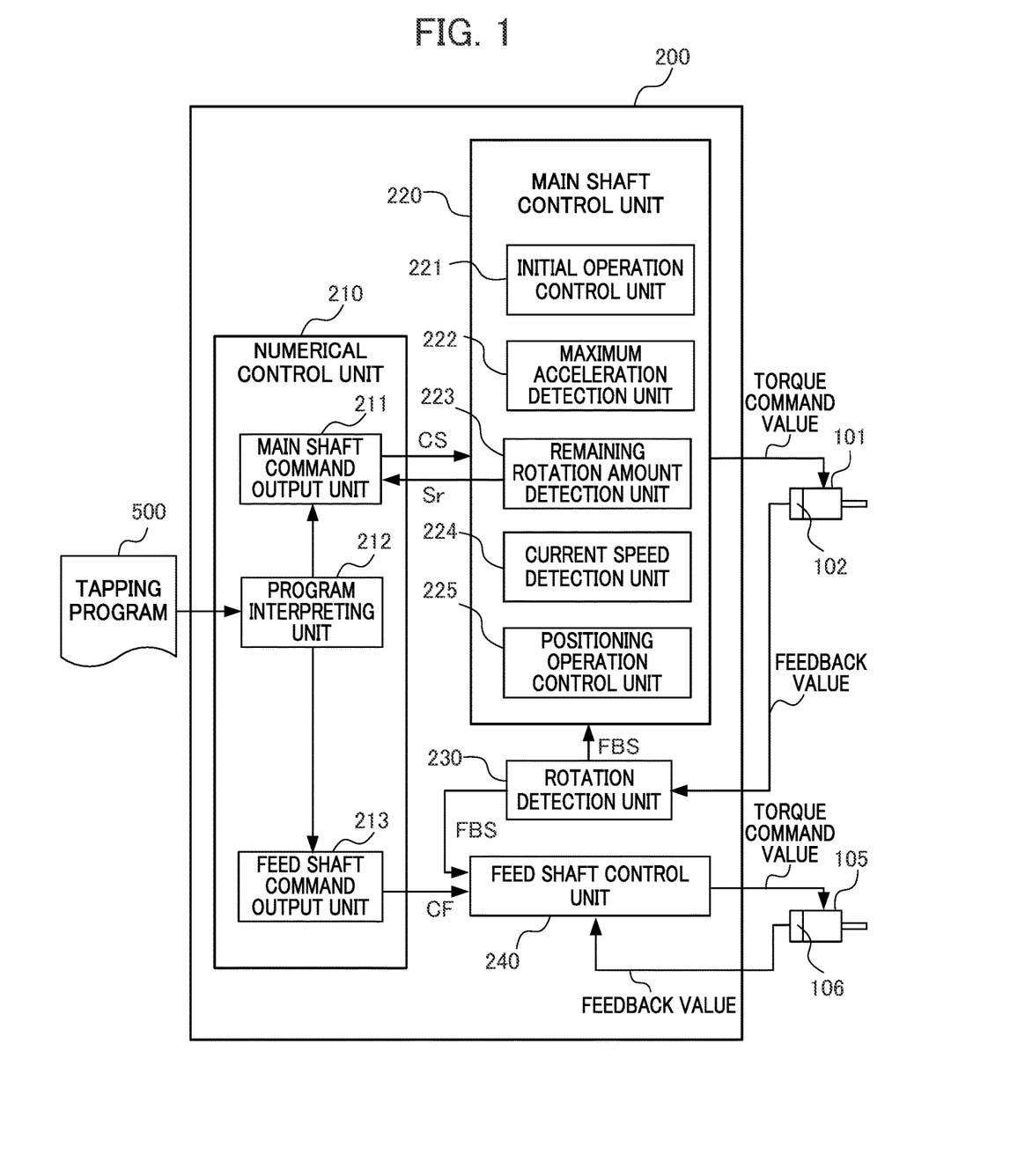
FIG. 1 is a view that illustrates an outline of a control device.

Description is given below regarding an example of an embodiment according to the present invention. FIG. 1 is a view that illustrates an outline of a control device 200. As illustrated in FIG. 1, for a machine tool (for example, a lathe, a drill press, a machining center, etc.) that performs tapping in accordance with synchronous operation by a main shaft 101 and a feed shaft 105, the control device 200 controls synchronous operation (a so-called master/slave synchronization method) in which the feed shaft 105 operates so as to follow rotation operation by the main shaft 101 while considering a thread pitch designated by a tapping program 500.

The control device 20 is provided with a numerical control unit 210, a main shaft control unit 220, a rotation detection unit 230, and a feed shaft control unit 240.

The numerical control unit 210 is provided with a main shaft command output unit 211, a program interpreting unit 212, and a feed shaft command output unit 213. The numerical control unit 210 can have a hardware configuration for a publicly known computerized numerical control (CNC) device.

Before the start of tapping, the main shaft command output unit 211 obtains, from a command value from the tapping program 500 which is interpreted by the program interpreting unit 212, a total rotation amount S and maximum rotation speed V for the main shaft 101 in a duration between a machining start position (rotation position) and until a target thread depth (rotation position) is reached. The main shaft command output unit 211 sends the total rotation amount S and the maximum rotation speed V to the main shaft control unit 220 as a main shaft command CS.

For example, in a case where the tapping program 500 includes a command for machining an internal thread having a thread pitch of 1.25 mm and a thread depth of 30 mm with the maximum rotation speed (a maximum rotation number per minute in this example) V for the main shaft 101 set to 3000 rev/min, the total rotation amount S for the main shaft 101 in the duration from the machining s tart position to reaching the target thread depth is 30÷1.25=24 (rev). Accordingly, the main shaft command output unit 211 notifies the maximum rotation speed V=3000 (rev/mm) and the total rotation amount S=24 (rev) to the main shaft control unit 220. In this manner, the main shaft command CS does not include a position command or an acceleration/deceleration command for causing the main shaft 101 to perform rotational motion until the target thread depth.

When performing a cutting operation and a pulling-out operation an arbitrarily-defined number of times from the machining start position until the target position, the main shaft command output unit 211 obtains, from the tapping program 500, the rotation amount S and the maximum rotation speed V for the main shaft 101 in the cutting operation and the pulling-out operation. The main shaft command output unit 211 then sends the rotation amount S and the maximum rotation speed V for the main shaft 101 to the main shaft control unit 220 as a main shaft command.

Specifically, before the main shaft control unit 220 starts moving the main shaft 101, the main shaft command output unit 211 obtains, from the tapping program 500, the rotation amount S and the maximum rotation speed V for the main shaft in the cutting operations and the pulling-out operations, and sends the rotation amount S and the maximum rotation speed V for the main shaft 101 to the main shaft control unit 220 as a main shaft command.

Using a main shaft command which corresponds to the rotation amount S and the maximum rotation speed V sent from the main shaft command output unit 211, the main shaft control unit 220 starts moving the main shaft 101 prior to a command from the numerical control unit 210.

The program interpreting unit 212 interprets the tapping program 500. The feed shaft command output unit 213 creates a feed shaft command CF in accordance with the interpretation by the program interpreting unit 212, and sends the feed shaft command CF to the feed shaft control unit 240.

The main shaft control unit 220 is provided with an initial operation control unit 221, a maximum acceleration detection unit 222, a remaining rotation amount detection unit 223, a current speed detection unit 224, and a positioning operation control unit 225. The initial operation control unit 221 uses speed control in which the maximum rotation speed V sent from the main shaft command output unit 211 is set as a target value to cause the main shaft 101 to undergo accelerating rotation, at maximum capability in which an allowable current for a drive source is maximally used, from the machining start position.

The maximum acceleration detection unit 222 detects a maximum acceleration A0 (min/s) based on a rotation position FBS during the accelerating rotation at the maximum capability. Based on the total rotation amount S sent from the main shaft command output unit 211 and the rotation position FBS outputted from the rotation detection unit 230, the remaining rotation amount detection unit 223 detects a remaining rotation amount Sr (rev) for the main shaft 101 from the current position (rotation position) until the target thread depth is reached.

The current speed detection unit 224 detects a current speed Vc ($min^{-1}$) for the main shaft 101 based on the rotation position FBS outputted from the rotation detection unit 230. When the current speed Vc reaches the maximum rotation speed V, rotation by the main shaft 101 changes from accelerating rotation to rotation at the maximum rotation speed V.

After the accelerating rotation at the maximum capability and based on the maximum acceleration A0, the remaining rotation amount Sr, and the current speed Vc, the positioning operation control unit 225 executes position control for causing the main shaft. 101 to undergo decelerating rotation at a maximum deceleration corresponding to the maximum acceleration and thereby cause the main shaft 101 to reach the target thread depth.

In one embodiment, the positioning opera Lion control unit 225 can be configured to causes the main shaft 101 to undergo decelerating rotation at the maximum deceleration corresponding to the maximum acceleration arm stop at the target thread depth. In addition, in one embodiment, the positioning operation control unit 225 may be configured to cause the main shaft. 101 to undergo accelerating reverse-rotation to a predefined rotation position, at a reverse-rotation acceleration A0 (a negative value) that is the same as the maximum deceleration A0 (a negative value) in decelerating rotation, without t causing the main shaft 101 to stop at the target thread depth (in other words without setting the acceleration to zero).

The main shaft control unit 220 uses the rotation position FBS (in other words, a feedback value) for the main shaft 101 detected by the rotation detection unit 230 to send a torque command value to the main shaft 101 and control rotation operation by the main shaft 101 in accordance with typical feedback control.

The rotation detection unit 230 can obtain the rotation position FBS from an output by a position detector 102, which is, for example, an encoder that detects the operation position of the main shaft 101.

In accordance with the feed shaft command CF sent from the feed shaft command output unit 213, the feed shaft control unit 240 uses the rotation position FBS from the main shaft 101 in addition to a feed position feedback value from a position detector 106 which is, for example, an encoder that detects the operation position of the feed shaft 105, and uses feedback control to control a feeding operation by the feed shaft 105 to follow operation by the main shaft

101. Note that the feed shaft control unit 240 linearly feeds the feed shaft 105 in the Z direction with respect to a workpiece. However, two feed shaft control units that control two feed shafts for causing a workpiece or a tool to undergo a feeding operation in an X axis direction and a Y axis direction may be additionally provided.

While the main shaft control unit 220 is controlling rotation operation by the main shaft from the machining start position to the target thread depth, the feed shaft control unit 240 uses the rotation position FBS for the main shaft 101 to cause a feeding operation by performing control such that the feed shaft 105 follows operation by the main shaft 101. While the main shaft control unit 220 is executing a tapping process, the numerical control unit 210 monitors the remaining rotation amount Sr notified from the main shaft control unit 220, and determines that tapping has reached the target thread depth when the remaining rotation amount Sr becomes equal to or less than a first predetermined value (a very small value close to zero).

FIRST EMBODIMENT

Figure 2:
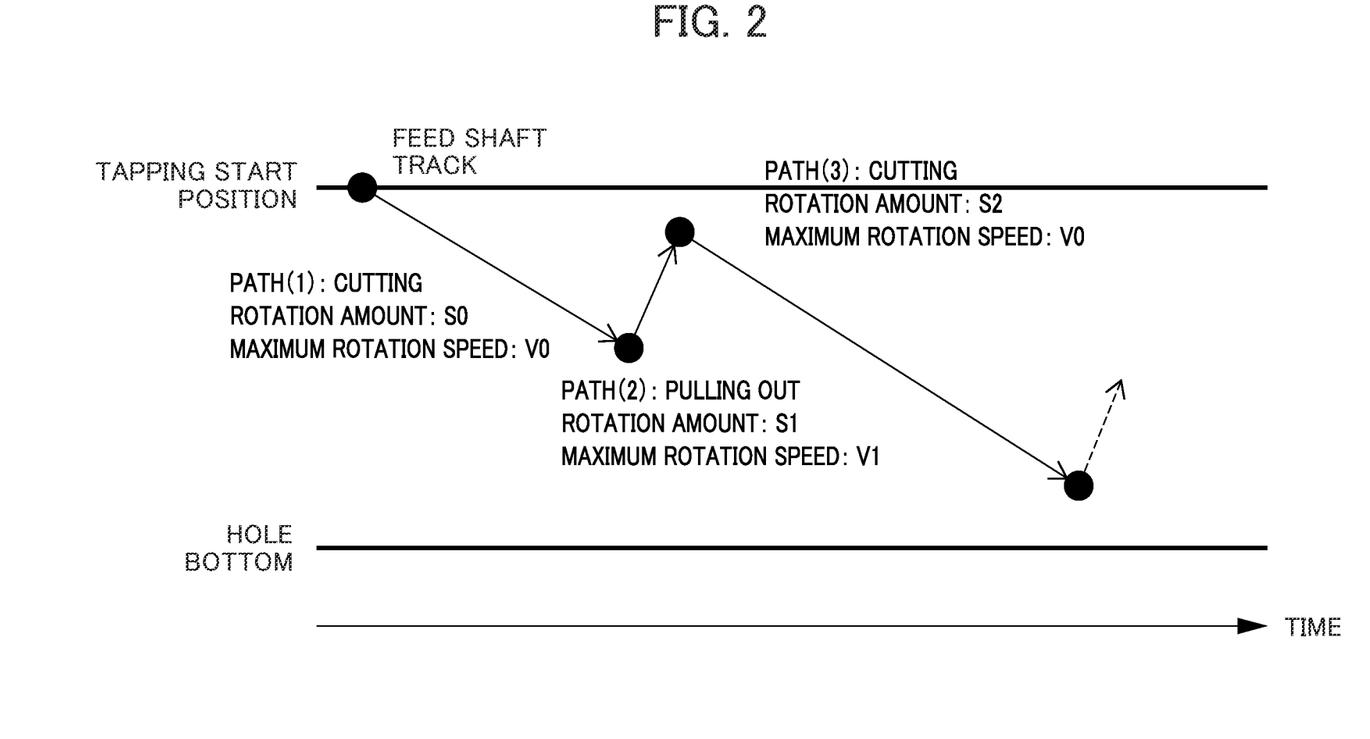
FIG. 2 is a view for describing tapping by a control device according to a first embodiment.

FIG. 2 is a view for describing tapping by the control device 200 according to the first embodiment. The control device 200 performs tapping by performing a cutting operation and a pulling-out operation an arbitrarily-defined number of times from the machining start position until the target position (hole bottom).

As illustrated in FIG. 2, the main shaft control unit 220 uses a rotation amount S0 and a maximum rotation speed V0 for the main shaft 101 to perform a cutting operation from a tapping start position until a first target position. Next, the main shaft control unit 220 uses a rotation amount S1 and a maximum rotation speed V1 for the main shaft 101 to perform a pulling-out operation from the first target position, at which the cutting operation ended, until a second target position.

Next, the main shaft control unit 220 uses a rotation amount S3 and the maximum rotation speed V0 for the main shaft 101 to perform a cutting operation from the second target position, at which the pulling-out operation ended, until a third target position.

Such tapping is performed by repeating a cutting operation and a pulling-out operation, and the main shaft 101 finally reaches the target position (hole bottom), Note that, in the example illustrated in FIG. 2, the maximum rotation speed in a cutting operation is V0, and the maximum rotation speed in a pulling-out operation is V1.

Figure 3:
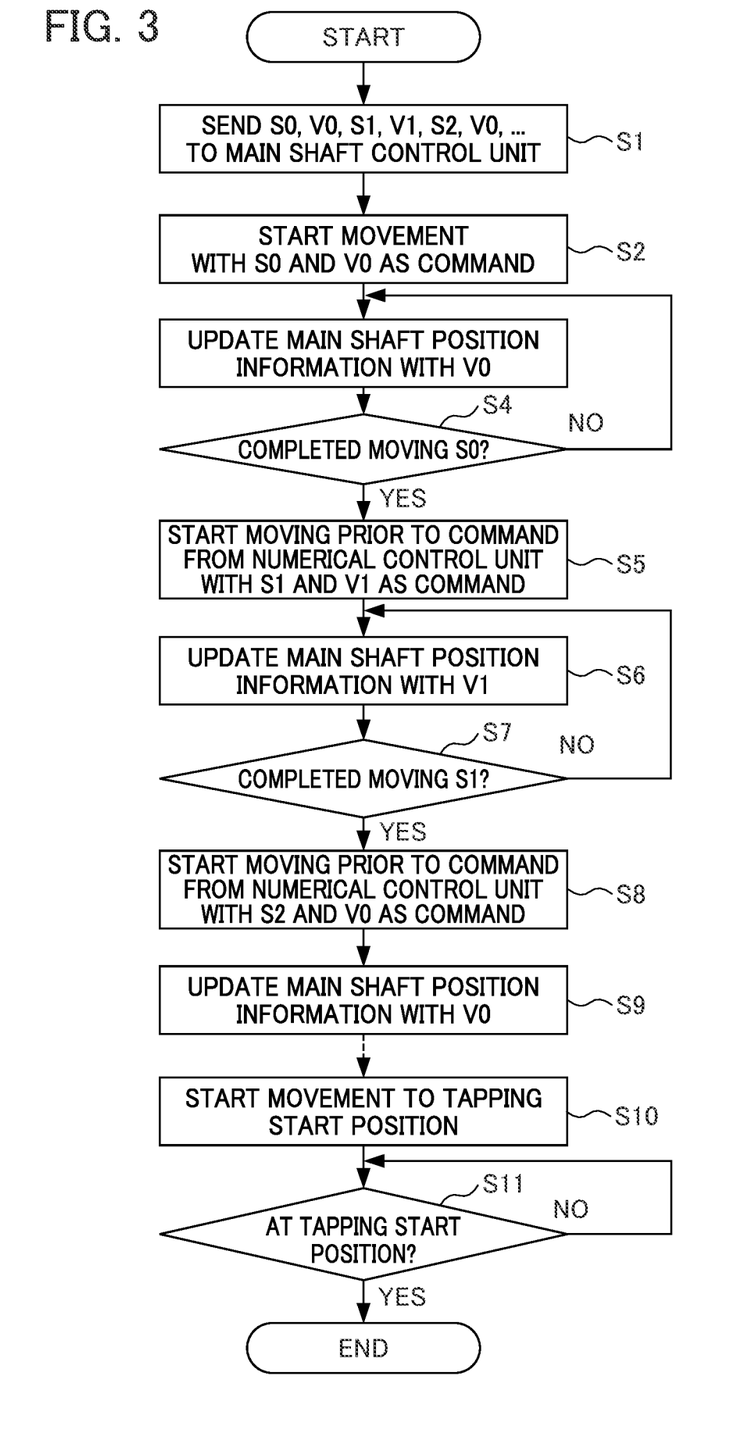
FIG. 3 is a flow chart that illustrates a process for tapping by the control device according to the first embodiment.

FIG. 3 is a flow chart that illustrates a process for capping by the control device 200 according to the first embodiment. In step S1, before starting rotation control for the main shaft 101 by the main shaft control unit 220, the main shaft command output unit 211 obtains, from the tapping program 500, rotation amounts S0, S1, S2, . . . and maximum rotation speeds V0 and V1 for the main shaft 101 in cutting operations and pulling-out operations. The main shaft command output unit 211 then sends the rotation amounts S0, S1, S2, . . . and the maximum rotation speeds V0 and V1 for the main shaft 201 in cutting operations and pulling-out operations to the main shaft control unit 220 as a main shaft command.

In step S2, the main shaft control unit 220 starts moving the main shaft 101, with the rotation amount S0 and the maximum rotation speed V0 for the main shaft 101 as a main shaft command.

In step S3, the main shaft control unit 220 uses the rotation amount S0 and the maximum rotation speed V0 for the main shaft 101 to perform a cutting operation from the tapping start position until the first target position.

In step S4, the main shaft control unit 220 determines whether the main shaft 101 has completed moving the rotation amount S0. In the case where the main shaft 101 has completed moving the rotation amount S0 (YES), the process transitions to step S5. In the case where the main shaft 101 has not completed moving the rotation amount S0 (NO), the process returns to step S3.

In step S5, after the end of the cutting operation in step S3—in other words after the main shaft 101 has completed moving the rotation amount S0, the main shaft control unit 220, prior to a command from the numerical control unit 210, starts moving the main shaft 101 with the rotation amount S1 and the maximum rotation speed V1 sent from the main shaft command output unit 211 as a main shaft command.

In step S6, the main shaft control unit 220 uses the rotation amount S1 and the maximum rotation speed V1 for the main shaft 101 to perform a pulling-out operation from the first target position, at which the cutting operation ended, until the second target position.

In step S7, the main shaft control unit 220 determines whether the main shaft 101 has completed moving the rotation amount S1. In the case where the main shaft 101 has completed moving the rotation amount S1 (YES), the process transitions to step S8. In the case where the main shaft 101 has not completed moving the rotation amount S1 (NO), the process returns to step S6.

In step S8, after the end of the pulling-out operation in step S6—in other words after the main shaft 101 has completed moving the rotation amount S1, the main shaft control unit 220, prior to a command from the numerical control unit 210, starts moving the main shaft 101 with the rotation amount S2 and the maximum rotation speed V0 sent from the main shaft command output unit 211 as a main shaft command.

In step S9, the main shaft control unit 220 uses the rotation amount S2 and the maximum rotation speed V0 for the main shaft 101 to perform a cutting operation from the second target position, at which the pulling-out operation ended, until the third target position.

Until the main shaft 101 reaches the hole bottom, the process repeats processing similar to from step S3 to step S9, and the process subsequently transitions to step S10.

In step S10, after the main shaft 101 has reached the hole bottom, the main shaft control unit 220 starts moving the main shaft 101 to the tapping start position, with a rotation amount Sn and a maximum rotation speed V1 sent from the main shaft command output unit 211 as a main shaft command.

In step S11, the main shaft control unit 220 uses the rotation amount Sn and the maximum rotation speed V1 for the main shaft 101 to perform a pulling-out operation from the hole bottom to the tapping start position. The main shaft control unit 220 determines whether the main shaft 101 has completed moving to the tapping start position. In the case where the main shaft 101 has completed moving to the tapping start position (YES), the process subsequently ends. In the case where the main shaft 101 has not completed moving to the tapping start position (NO), the process repeats step S11.

SECOND EMBODIMENT

Next, description is given regarding a tapping process by the control device 200 according to a second embodiment.

The second embodiment differs from the first embodiment in that the rotation amounts and the maximum rotation speeds in cutting operations and pulling-out operations are changed.

Figure 4:
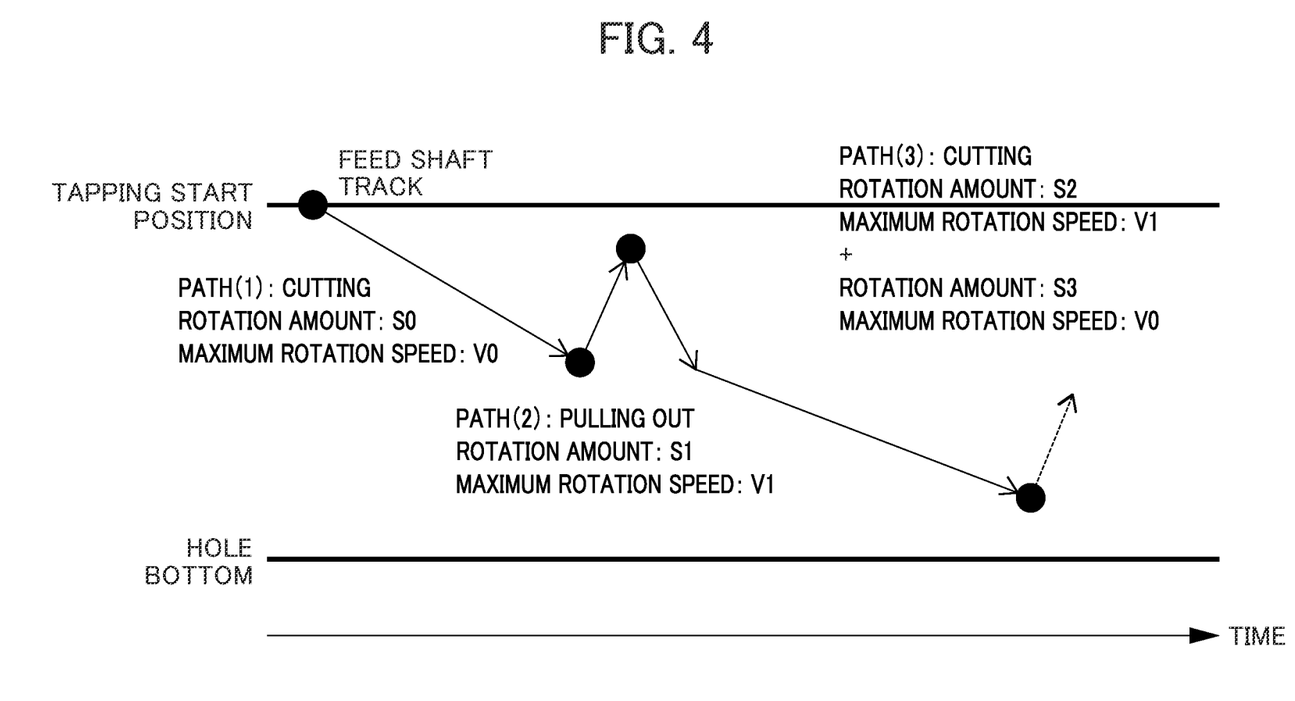
FIG. 4 is a view for describing tapping by a control device according to a second embodiment.

Specifically, the rotation amount and the maximum rotation speed for the main shaft 101 are chanced at a predetermined position in a cutting operation or a pulling-out operation. The main shaft command output unit 211 obtains, from the tapping program 500, a first rotation amount for before the change for the main shaft 101, a second rotation amount for after the change for the main shaft 101, a first maximum rotation speed for before the change for the main shaft 101, and a second maximum rotation speed for after the change for the main shaft 101. The main shaft command output unit 211 sends the first rotation amount, the second rotation amount, the first maximum rotation speed, and the second maximum rotation speed to the main shaft control unit 220 as a main shaft command.

More specifically, it may be that the rotation amount and the maximum rotation speed for the main shaft 101 are changed at a predetermined position during a cutting operation after a pulling-out operation, and the predetermined position is the target position for the immediately prior pulling-out operation. Here, for the cutting operation after the pulling-out operation, the control device 200 starts the cutting operation from the target position (arrival position) for the pulling-out operation.

Because a portion at which the pulling-out operation is performed is already machined, the tool follows the machined portion, and the cutting operation becomes no-load machining. Accordingly, the maximum rotation speed for the main shaft 101 at the machined portion can be set to a speed that is faster than a cutting speed, and it is possible to further shorten cycle time.

The rotation amount and the maximum rotation speed for the main shaft 101 may also be changed at a predetermined position in a pulling-out operation after a cutting operation.

FIG. 4 is a view for describing tapping by the control device 200 according to the second embodiment. As illustrated in FIG. 4, the main shaft control unit 220 uses the rotation amount S0 and the maximum rotation speed V0 for the main shaft 101 to perform a cutting operation from a tapping start position until a first target position. Next, the main shaft control unit 220 uses the rotation amount S1 and the maximum rotation speed V1 for the main shaft. 101 to perform a pulling-out operation from the first target position, at which the cutting operation ended, until a second target position.

Next, the main shaft control unit 220 uses the rotation amount S2 and the maximum rotation speed V1 for the main shaft 101 to perform a cutting operation from the second target position, at which the pulling-out operation ended, until the first target position, at which the cutting operation ended. Furthermore, the main shaft control unit 220 uses the rotation amount S3 and the maximum rotation speed V0 for the main shaft 101 to perform a cutting operation from the first target position until a third target position.

In this manner, by using the rotation amount S2 and the maximum rotation speed V1 to perform a cutting operation from the second target position, at which cutting was already completed, until the first target position, it is possible to move the main shaft 101 at a faster speed than the maximum rotation speed V0 in an actual cutting operation.

Such tapping is performed by repeating a cutting operation and a pulling-out operation, and the main shaft 101 finally reaches the target thread depth (hole bottom).

Figure 5:
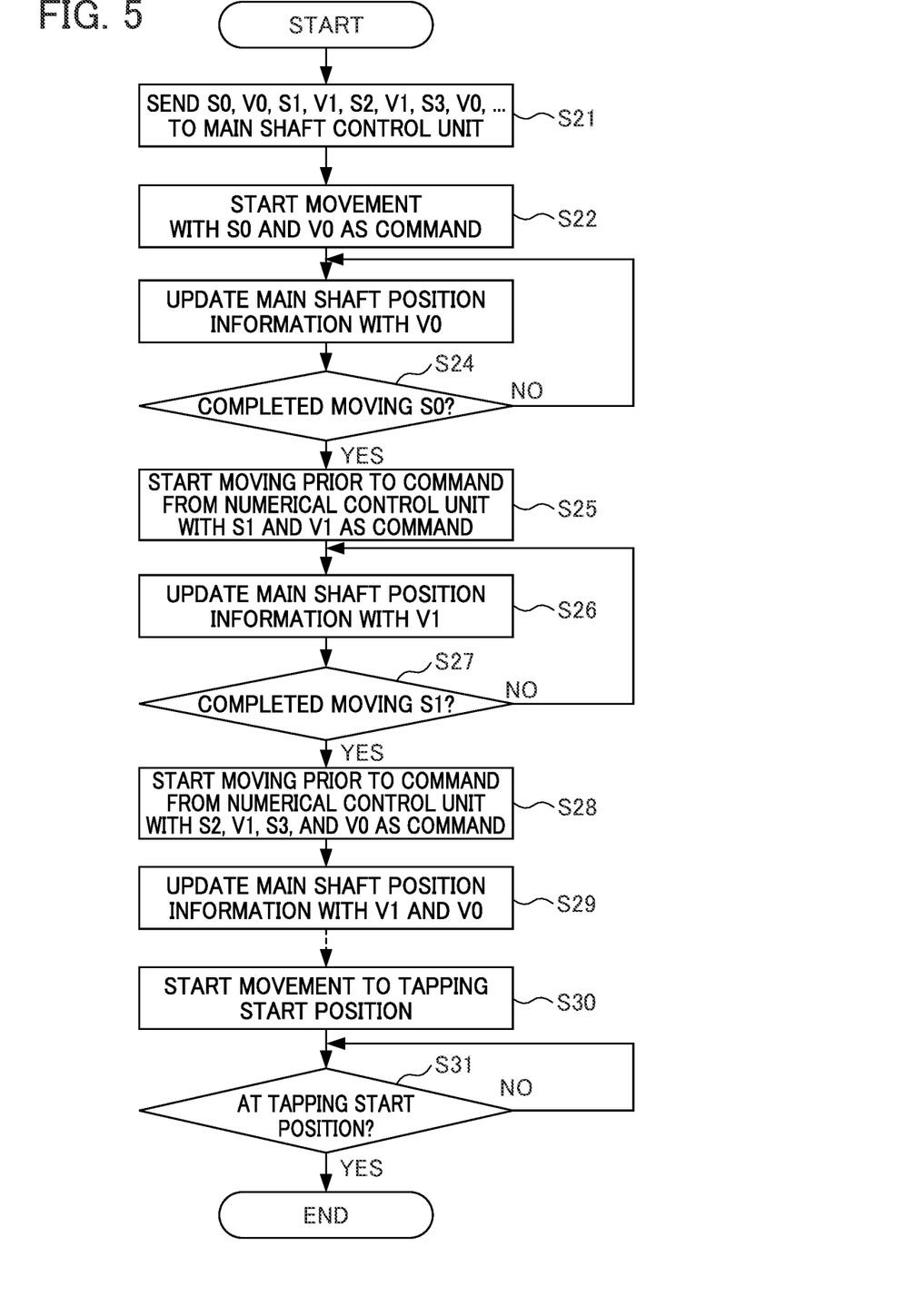
FIG. 5 is a flow chart that illustrates a process for tapping by the control device according to the second embodiment.

FIG. 5 is a flow chart that illustrates a process for tapping by the control device 200 according to the second embodiment. In step S21, before starting rotation control for the main shaft 101 by the main shaft control unit 220, the main shaft command output unit 211 obtains, from the tapping program 500, rotation amounts S0, S1, S2, S3, . . . and maximum rotation speeds V0 and V1 for the main shaft 101 in cutting operations and pulling-out operations. The main shaft command output unit 211 then sends the rotation amounts S0, S1, S2, S3, . . . and the maximum rotation speeds V0 and V1 for the main shaft 101 in cutting operations and pulling-out operations to the main shaft control unit 220 as a main shaft command.

In step S22, the main shaft control unit 220 starts moving the main shaft 101, with the rotation amount S0 and the maximum rotation speed V0 for the main shaft 101 as a main shaft command.

In step S23, the main shaft control unit 220 uses the rotation amount S0 and the maximum rotation speed V0 for the main shaft 101 to perform a cutting operation from the tapping start position until the first target position.

In step S24, the main shaft control unit 220 determines whether the main shaft 101 has completed moving the rotation amount S0. In the case where the main shaft 101 has completed moving the rotation amount S0 (YES), the process transitions to step S25. In the case where the main shaft 101 has not completed moving the rotation amount S0 (NO), the process returns to step 323.

In step S25, after the end of the cutting operation in step S23—in other words after the main shaft 101 has completed moving the rotation amount S0, the main shaft control unit 220, prior to a command from the numerical control unit 210, starts moving the main shaft 101 with the rotation amount S1 and the maximum rotation speed V1 sent from the main shaft command output unit 211 as a main shaft command.

In step S26, the main shaft control unit 220 uses the rotation amount S1 and the maximum rotation speed V1 for the main shaft 101 to perform a palling-out operation from the first target position, at which the cutting operation ended, until the second target position.

In step S27, the main shaft control unit 220 determines whether the main shaft 101 has completed moving the rotation amount S1. In the case where the main shaft 101 has completed moving the rotation amount S1 (YES), the process transitions to step S28. In the case where the main shaft 101 has not completed moving the rotation amount S1 (NO), the process returns to step S26.

In step S28, after the end of the pulling-out operation in step S28—in other words after the main shaft 101 has completed moving the rotation amount S1, the main shaft control unit 220, prior to a command from the numerical control unit 210, starts moving the main shaft 101 with the rotation amount S2, the maximum rotation speed V1, the rotation amount S3, and the maximum rotation speed V0 which are sent from the main shaft command output unit 211 as a main shaft command.

In step S29, the main shaft control unit 220 uses the rotation amount S2 and the maximum rotation speed V1 for the main shaft 101 to perform a cutting operation from the second target position, at which the pulling-out operation ended, until the first target position, at which the cutting operation ended. Furthermore, the main shaft control unit 220 uses the rotation amount S3 and the maximum rotation speed V0 for the main shaft 101 to perform a cutting operation from the first target position until a third target position.

Until the main shaft 101 reaches the hole bottom, the process repeats processing similar to from step S23 to step S29, and the process subsequently transitions to step S30.

In step S30, after the main shaft 101 has reached the hole bottom, the main shaft control unit 220 starts moving the main shaft 101 to the tapping start position, with a rotation amount Sn and a maximum rotation speed V1 sent from the main shaft command output unit 211 as a main shaft command.

In step S31, the main shaft control unit 220 uses the rotation amount Sn and the maximum rotation speed V1 for the main shaft 101 to perform a pulling-out operation from the hole bottom to the tapping start position. The main shaft control unit 220 determines whether the main shaft 101 has completed moving to the tapping start position. In the case where the main shaft 101 has completed moving to the tapping start position (YES), the process subsequently ends. In the case where the main shaft 101 has not completed moving to the tapping start position (NO), the process repeats step S31.

By virtue of the embodiments as described above, the control device 200 for a machine tool is provided with a numerical control unit 210 that, based on the tapping program 500, creates a main shaft command and a feed shaft command, a main shaft control unit 220 that controls a rotation operation by the main shaft 101 in accordance with the main shaft command, a rotation detection unit 230 that detects the rotation position of the main shaft 101, and a feed shaft control unit 240 that, based on the rotation position, controls a feeding operation by the feed shaft in accordance with the feed shaft command. The numerical control unit 210 has a main shaft command output unit 211 that, when performing a cutting operation and a pulling-out operation an arbitrarily-defined number of times from a machining start position until a target position, obtains, from the tapping program 500, rotation amounts and maximum rotation speeds for the main shaft 101 in the cutting operations and the pulling-out operations, and sends the rotation amounts and the maximum rotation speeds for the main shaft 101 to the main shaft control unit 220 as a main shaft command.

As a result, the main shaft control unit 220, by using the rotation amounts and the maximum rotation speeds for the main shaft 101 that were sent in advance, can start moving the main shaft 101 in the next pulling-out operation or cutting operation after completion of a cutting operation or a pulling-out operation. Accordingly, the control device 200 can further reduce command-wait ng time in the main shaft control unit 220. Accordingly, the control device 200 can shorten cycle time for tapping.

Before the main shaft control unit 220 starts moving the main shaft 101, the main shaft command output unit 211 obtains, from the tapping program 500, rotation amounts and the maximum rotation speeds for the main shaft 101 in the cutting operations and the pulling-out operations, and sends the rotation amounts and the maximum rotation speeds for the main shaft 101 to the main shaft control unit 220 as a main shaft command.

As a result, the main shaft control unit 220, by obtaining the rotation amounts and the maximum rotation speeds for the main shaft 101 before starting to move the main shaft 101, can start moving the main shaft 101 in the next pulling-out operation or cutting operation after completion of a cutting operation or a pulling-out operation. Accordingly, the control device 200 can further reduce command-waiting time in the main shaft control unit 220.

With the rotation amounts and the maximum rotation speeds sent from the main shaft command output unit 211 as a main shaft command, the main shaft control unit 220 starts moving the main shaft 101 prior to a command from the numerical control unit 210. As a result, the control device 200 can further reduce command-waiting time in the main shaft control unit 220.

The rotation amount and the maximum rotation speed for the main shaft 101 are changed at a predetermined position in a cutting operation or a pulling-out operation. The main shaft command output unit 211 obtains, from the tapping program 500, a first rotation amount for before a change for the main shaft 101, a second rotation amount for after the change for the main shaft 101, a first maximum rotation speed for before the change for the main shaft 101, and a second maximum rotation speed for after the change for the main shaft 101. The main shaft command output unit 211 sends the first rotation amount, the second rotation amount, the first maximum rotation speed, and the second maximum rotation speed to the main shaft control unit 220 as a main shaft command.

As a result, the control device 200 changes the rotation amount and the maximum rotation speed for the main shaft 101 during a cutting operation or a pulling-out operation, whereby it is possible to further shorten the cycle time for tapping.

The rotation amount and the maximum rotation speed for the main shaft 101 are changed at a predetermined position during a cutting operation after a pulling-out operation, and the predetermined position is the target position for the immediately prior pulling-out operation. As a result, the control device 200 changes the rotation amount and the maximum rotation speed for the main shaft 101 during a cutting operation after a pulling-out operation, whereby it is possible to further shorten the cycle time for tapping.

Description was given above regarding embodiments of the present invention, but the control device 200 described above can be realized by hardware, software, or a combination of these. A control method performed by the control device 200 described above can be realized by hardware, software, or a combination of these. Being realized by software means being realized by a computer reading and executing a program.

A program can be stored using various types of non-transitory computer-readable mediums and supplied to a computer. A non-transitory computer-readable medium includes various types of tangible storage mediums. An example of a non-transitory computer-readable medium includes a magnetic recording medium (for example, a floppy disk, magnetic tape, or a hard disk drive), a magneto-optical recording medium (for example, a magneto-optical disk), a CD-ROM (read-only memory), CD-R, CD-R/W, and a semiconductor memory (for example, a mask ROM, a programmable ROM (PROM), an erasable PROM (EPROM), a flash ROM, or a random-access memory (RAM)).

Each embodiment described above is a suitable embodiment of the present invention, but the scope of the present invention is not limited to only the embodiments described above. The present invention can be worked in forms resulting from making various modifications within a range that does not deviate from the spirit of the present invention.

EXPLANATION OF REFERENCE NUMERALS

200 Control device
210 Numerical control unit

211 Main shaft command output unit
212 Program interpreting unit
213 Feed shaft command output Unit
220 Main shaft control unit
221 Initial operation control unit
222 Rotation amount detection unit
223 Remaining rotation amount detection unit
224 Current speed detection unit
225 Positioning operation control unit
230 Rotation detection unit
240 Feed shaft control unit

The invention claimed is:

1. A control device for a machine tool, configured to control synchronous operation for a main shaft and a feed shaft, the control device comprising:
   a numerical control unit configured to, based on a tapping program, create a main shaft command and a feed shaft command;
   a main shaft control unit configured to control a rotation operation by the main shaft in accordance with the main shaft command;
   a rotation detection unit configured to detect a rotation position of the main shaft; and
   a feed shaft control unit configured to, based on the rotation position, control a feeding operation by the feed shaft in accordance with the feed shaft command,
   wherein the numerical control unit has
      a main shaft command output unit configured to, when performing two or more times of cutting operations and one or more times of pulling-out operations from a machining start position until a target position, obtain, from the tapping program, a rotation amount and a maximum rotation speed for the main shaft in each operation of the cutting operations and the pulling-out operations, and send the rotation amount and the maximum rotation speed for the main shaft to the main shaft control unit as the main shaft command, and
   the main shaft control unit has
      an initial operation control unit configured to cause the main shaft to undergo accelerating rotation, at a maximum capability in which an allowable current for a drive source is maximally used, from the machining start position toward the target position, with the maximum rotation speed as a target value,
      a maximum acceleration detection unit configured to, based on the rotation position during the accelerating rotation at the maximum capability, detect a maximum acceleration,
      a remaining rotation amount detection unit configured to, based on the rotation amount and the rotation position, detect a remaining rotation amount for the main shaft from a current position until the target position is reached,
      a current speed detection unit configured to, based on the rotation position, detect a current speed for the main shaft, and
      a positioning operation control unit configured to, after the accelerating rotation at the maximum capability and based on the maximum acceleration, the remaining rotation amount, and the current speed, cause the main shaft to undergo decelerating rotation at a maximum deceleration corresponding to the maximum acceleration and cause the main shaft to reach the target position.

2. The control device according to claim 1, wherein, before the main shaft control unit starts moving the main shaft, the main shaft command output unit obtains, from the tapping program, the rotation amount and the maximum rotation speed for the main shaft in the cutting operation and the pulling-out operation, and sends the rotation amount and the maximum rotation speed for the main shaft to the main shaft control unit as the main shaft command.

3. The control device according to claim 1, wherein the main shaft control unit starts moving the main shaft prior to another main shaft command, with the rotation amount and the maximum rotation speed for the main shaft in a next cutting operation or pulling-out operation sent from the main shaft command output unit as the main shaft command.

4. The control device according to claim 1, wherein
   the rotation amount and the maximum rotation speed for the main shaft are changed at a predetermined position in the cutting operation or the pulling-out operation, and
   the main shaft command output unit
      obtains, from the tapping program, a first rotation amount for before the change for the main shaft, a second rotation amount for after the change for the main shaft, a first maximum rotation speed for before the change for the main shaft, and a second maximum rotation speed for after the change for the main shaft, and
      sends the first rotation amount, the second rotation amount, the first maximum rotation speed, and the second maximum rotation speed to the main shaft control unit as the main shaft command.

5. The control device according to claim 4, wherein
   the rotation amount and the maximum rotation speed for the main shaft are changed at a predetermined position in the cutting operation after the pulling-out operation, and
   the predetermined position is the target position in the immediately prior pulling-out operation.

6. A control method for a machine tool, configured to control synchronous operation for a main shaft and a feed shaft, the control method comprising:
   when performing two or more times of cutting operations and one or more times of pulling-out operations from a machining start position until a target position, obtaining, from a tapping program, a rotation amount and a maximum rotation speed for the main shaft in each operation of the cutting operations and the pulling-out operations;
   causing the main shaft to undergo accelerating rotation, at a maximum capability in which an allowable current for a drive source is maximally used, from the machining start position toward the target position, with the maximum rotation speed as a target value;
   based on a rotation position feedback value for the main shaft during the accelerating rotation at the maximum capability, detecting a maximum acceleration;
   based on the rotation amount and the rotation position feedback value, detecting a remaining rotation amount for the main shaft from a current position until the target position is reached;
   based on the rotation position feedback value, detecting a current speed for the main shaft; and
   after the accelerating rotation at the maximum capability and based on the maximum acceleration, the remaining rotation amount, and the current speed, causing the main shaft to undergo decelerating rotation at a maximum deceleration corresponding to the maximum acceleration and causing the main shaft to reach the target position.

* * * * *